(12) United States Patent
Kirchner et al.

(10) Patent No.: US 9,751,163 B2
(45) Date of Patent: Sep. 5, 2017

(54) METHOD FOR PRODUCING A PENDULUM OF A PENDULUM SLIDE CELL PUMP

(71) Applicant: Mahle International GmbH, Stuttgart (DE)

(72) Inventors: Marco Kirchner, Auengrund/OT Poppenwind (DE); André Maeder, Hildburghausen (DE); Christian Richter, Schleusingen (DE)

(73) Assignee: Mahle International GmbH (DE)

( * ) Notice: Subject to any disclaimer, the term of this patent is extended or adjusted under 35 U.S.C. 154(b) by 97 days.

(21) Appl. No.: 14/705,643

(22) Filed: May 6, 2015

(65) Prior Publication Data
US 2015/0322943 A1   Nov. 12, 2015

(30) Foreign Application Priority Data
May 7, 2014 (DE) .......................... 10 2014 208 579

(51) Int. Cl.
| | |
|---|---|
| *F04C 2/332* | (2006.01) |
| *F04C 14/22* | (2006.01) |
| *B23P 13/00* | (2006.01) |
| *F01C 21/08* | (2006.01) |
| *F04C 18/332* | (2006.01) |
| *B21K 1/18* | (2006.01) |
| *B21H 1/02* | (2006.01) |

(52) U.S. Cl.
CPC ................ *B23P 13/00* (2013.01); *B21H 1/02* (2013.01); *B21K 1/18* (2013.01); *F01C 21/0809* (2013.01); *F04C 2/332* (2013.01); *F04C 14/22* (2013.01); *F04C 14/223* (2013.01); *F04C 14/226* (2013.01); *F04C 18/332* (2013.01); *F04C 2230/25* (2013.01); *F04C 2230/26* (2013.01); *Y10T 29/49231* (2015.01)

(58) Field of Classification Search
CPC ...... F04C 2/332; F04C 14/226; F04C 14/223; F04C 14/22; F04C 18/332; B23P 13/00; F01C 21/0809
USPC ...................... 418/259; 417/220; 29/888.025
See application file for complete search history.

(56) References Cited

U.S. PATENT DOCUMENTS

| | | | | |
|---|---|---|---|---|
| 5,716,195 A | * | 2/1998 | Thut ....................... | F04D 7/065 417/360 |
| 2002/0166611 A1 | * | 11/2002 | Sugiura ............... | F04B 27/0886 148/693 |

(Continued)

FOREIGN PATENT DOCUMENTS

| | | |
|---|---|---|
| DE | 4434430 A1 | 3/1996 |
| DE | 102010041546 A1 | 3/2012 |

(Continued)

OTHER PUBLICATIONS

English abstract provided for DE-102011117303.
English abstract provided for DE-102013205244.
English abstract provided for DE-4434430.

*Primary Examiner* — Mark Laurenzi
*Assistant Examiner* — Wesley Harris
(74) *Attorney, Agent, or Firm* — Fishman Stewart PLLC

(57) ABSTRACT

A method for producing a pendulum of a pendulum slide cell pump may include providing a prefabricated pendulum body and performing a post-machining operation on the pendulum body only at a plurality of contact locations at which the pendulum body contacts at least one of an inner rotor and an outer rotor of the pendulum slide cell pump.

20 Claims, 1 Drawing Sheet

(56) References Cited

U.S. PATENT DOCUMENTS

2006/0191360 A1* 8/2006 Beez ................. F04C 2/348
  74/25
2012/0082582 A1 4/2012 Richter et al.

FOREIGN PATENT DOCUMENTS

DE 102011117303 A1 5/2013
DE 102013205244 A1 9/2014

* cited by examiner

METHOD FOR PRODUCING A PENDULUM OF A PENDULUM SLIDE CELL PUMP

CROSS-REFERENCE TO RELATED APPLICATIONS

This application claims priority to German Patent Application No. 10 2014 208 579.9, filed May 7, 2014, the contents of which are hereby incorporated by reference in their entirety.

TECHNICAL FIELD

The present invention relates to a method for producing a pendulum of a pendulum slide cell pump. The invention also relates to a pendulum of a pendulum slide cell pump produced using said method and to a pendulum slide cell pump having such a pendulum.

BACKGROUND

The use of quantity-regulated pendulum slide cell pumps in internal combustion engines has been part of the prior art for a long time, in order to for example be able to adapt an output and a pressure easily to the requirements of the internal combustion engine. An adaptation of the output or pressure in such a pendulum slide cell pump usually takes place by adjusting the eccentricity of an inner rotor with respect to an outer rotor. Such pendulum slide cell pumps have an outer rotor, which is connected in a rotationally fixed manner to an inner rotor by means of pendulums, the inner rotor usually being driven by means of a drive shaft. The pendulums that connect the outer rotor to the inner rotor are usually produced by means of a rolling or drawing process and then finished by post-machining, for example grinding, on their outer contour.

However, the disadvantage of known pendulums is that in particular the post-machining of the outer contour is possible only to a limited extent or not at all for small radii, and is therefore comparatively expensive.

SUMMARY

The present invention is therefore concerned with the problem of specifying an improved production method for a pendulum of a pendulum slide cell pump, by means of which method such a pendulum can be produced in a comparatively cost-effective but high-quality manner.

This problem is solved according to the invention by the subject matter of the independent claims. Advantageous embodiments form the subject matter of the dependent claims.

The present invention is based on the general concept of post-machining a pendulum of a pendulum slide cell pump only partially, specifically only at the locations at which a pendulum body of the pendulum, i.e. the pendulum itself, is in contact with an inner rotor or an outer rotor of the pendulum slide cell pump. The pendulum body itself is prefabricated in the usual manner, for example by forging, rolling or extrusion. If the actual pendulum slide cell pump is viewed, it can be seen that the pendulum body, i.e. the pendulum itself, can come into effective/frictional contact at a pendulum head with the outer rotor and on an outer side of a pendulum foot and at a pendulum neck with the inner rotor of the pendulum slide cell pump, so, purely theoretically, post-machining for reducing friction and increasing wear resistance is only necessary in said locations. The rest of the pendulum body that does not come into contact with the inner rotor or outer rotor therefore does not have to be post-machined, as a result of which the effort of post-machining the pendulum or pendulum body and therefore also the production costs of same can be considerably reduced without adversely affecting quality. Furthermore, a more compact design and as a result pendulum slide cell pumps of higher output can be made possible with new possible sliding contours (e.g. smaller radii or undercuts).

In an advantageous development of the method according to the invention, the pendulum body is ground, in particular by means of a computer numerical control (CNC) grinding device, and/or reamed by means of a plane/firmer chisel at the relevant locations, i.e. for example at the pendulum head, on an outer side of the pendulum foot or at the pendulum neck. Grinding is usually carried out at the pendulum head or on the outer side of the pendulum foot, whereas planing or reaming is used at the pendulum neck owing to the comparatively small radius. Of course, the use of a contoured grinding wheel, which already has the subsequently desired contour of the pendulum body as a negative form, is also conceivable for grinding.

The prefabrication of the pendulum body by forging, rolling, pultrusion or extrusion also makes comparatively cost-effective and high-quality rough fabrication of the pendulum body possible, it being possible in particular with extrusion and pultrusion methods to produce pendulums of widely varying lengths by simply cutting to size.

The present invention further relates to the general concept of fabricating a pendulum of a pendulum slide cell pump in a cost-effective manner by first prefabricating a pendulum body and then post-machining it only partially, i.e. only at the locations at which it is in actual effective contact with an inner rotor or outer rotor of a pendulum slide cell pump. A pendulum produced in this manner can be fabricated not only with high quality but also with greatly reduced post-machining effort, which has a positive effect on the production costs of such a pendulum and indirectly also on the production costs of a pendulum slide cell pump equipped with such a pendulum. In general, geometries that could not be produced with conventional methods can also be produced with pendulums produced according to the invention. In particular, smaller radii or even undercuts can be produced. Better utilisation of an installation space is possible thereby, as a result of which pendulum slide cell pumps equipped with the pendulum according to the invention take up less space but have the same output. The reduction in the diameter means that a drive power of such a pendulum slide cell pump according to the invention can also be reduced.

Further important features and advantages of the invention can be found in the subclaims, the drawings and the associated description of the figures using the drawings.

It is self-evident that the above-mentioned features and those still to be explained below can be used not only in the combination given in each case but also in other combinations or alone without departing from the scope of the present invention.

Preferred exemplary embodiments of the invention are shown in the drawings and are explained in more detail in the description below, the same reference symbols referring to the same or similar or functionally equivalent components.

BRIEF DESCRIPTION OF THE DRAWINGS

In the figures.

DETAILED DESCRIPTION

Figure 1:
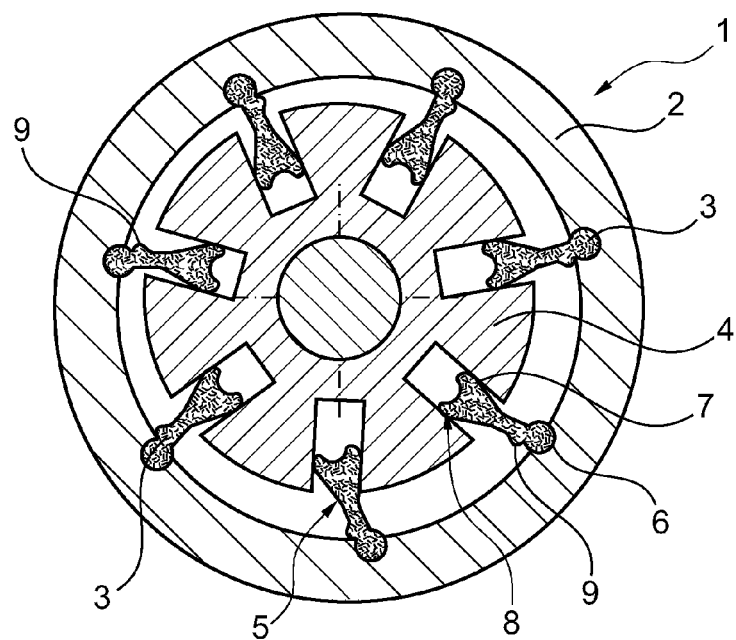
FIG. 1 schematically shows a sectional diagram through a pendulum slide cell pump according to the invention, FIG. 2 schematically shows a detail of a pendulum installed according to the pendulum slide cell pump shown in FIG. 1.
Figure 2:
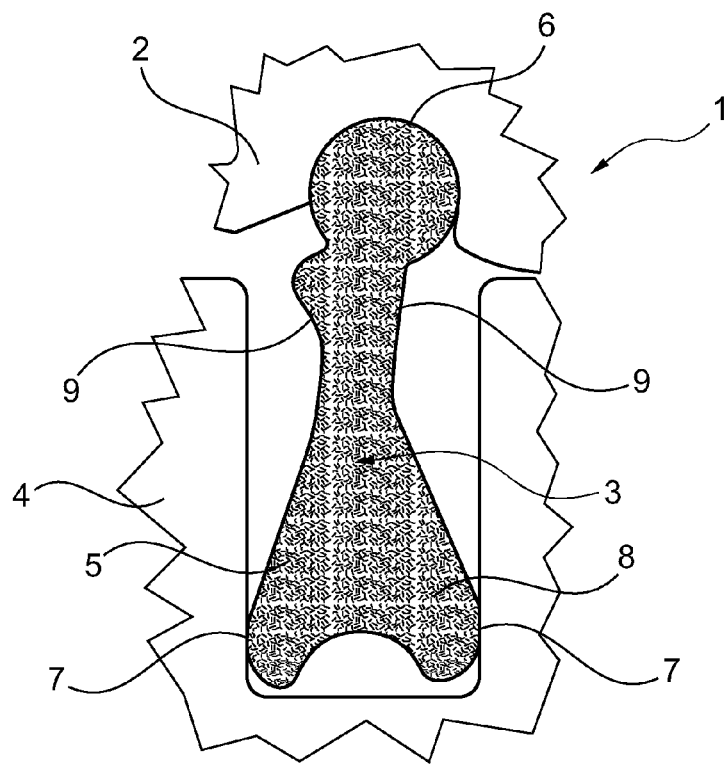

According to FIGS. 1 and 2, a pendulum slide cell pump 1 according to the invention has an outer rotor 2 and an inner rotor 4 connected thereto by means of pendulums 3. In order in particular to be able to reduce the production costs of the pendulum 3 and thus indirectly also of the pendulum slide cell pump 1, a pendulum body 5 of the pendulum 3 is first prefabricated and then post-machined partially, i.e. only at the locations 6, 7, 9 at which it is in contact with the inner rotor 4 or the outer rotor 2 of the pendulum slide cell pump 1.

The pendulum body 5, i.e. the pendulum 3, is prefabricated by forging, rolling, pultrusion or extrusion, as a result of which cost-effective and high-quality fabrication is possible. This prefabricated pendulum body 5 of the pendulum 3 is then post-machined, for example ground by means of a CNC grinding device and/or reamed by means of a plane/firmer chisel, at a pendulum head 6 (cf. FIG. 2), on an outer side 7 of a pendulum foot 8 and at a pendulum neck 9. This merely partial post-machining means that geometries that could not be implemented with previous production methods can also be produced. In particular, smaller radii and where applicable even undercuts can be produced, as a result of which better utilisation of the installation space and thus also a reduction in the size of the pendulum slide cell pump 1 is possible with the output remaining the same. Owing to the reduction in the size of the pump, in particular owing to the reduction in the diameter, a reduction in the drive power and thus lower-energy operation of the pendulum slide cell pump 1 can also be achieved. Post-machining can of course also take place by means of a contoured grinding wheel, which has a negative contour of the location 6, 7 or 9 that is to be machined of the pendulum body 5. Purely theoretically, the production of the pendulum body 5 is also conceivable by first reaming it out of a solid profile, for example by means of a parting blade or a plane, and then post-machining, in particular grinding, the locations 6, 7 and 9 that come into contact with the inner rotor 4 and outer rotor 2, respectively, of the pendulum slide cell pump 1.

The fact that the entire pendulum body 5 is no longer post-machined on its outer contour significantly reduces the post-machining effort, as a result of which the pendulums 3 can be produced in a more cost-effective manner overall.

The invention claimed is:

1. A method for producing a pendulum of a pendulum slide cell pump, comprising:
    providing a prefabricated pendulum body; and
    performing a post-machining operation on the pendulum body only at a plurality of contact locations at which the pendulum body contacts at least one of an inner rotor and an outer rotor of the pendulum slide cell pump, wherein performing the post-machining operation on the pendulum body defines a friction-reducing finished surface at the plurality of contact locations and a prefabricated surface along an outer contour of the pendulum body spaced apart from the plurality of contact locations.

2. The method according to claim 1, wherein the pendulum body is prefabricated via at least one of forging, rolling, pultrusion and extrusion.

3. The method according to claim 1, wherein the plurality of contact locations of the pendulum body includes at least one of a pendulum head, an outer side of a pendulum foot and a pendulum neck.

4. The method according to claim 1, wherein performing the post-machining operation on the pendulum body includes at least one of grinding and reaming the plurality of contact locations.

5. The method according to claim 1, wherein performing the post-machining operation on the pendulum body includes grinding only at least one of a pendulum head, a pendulum foot and a pendulum neck.

6. The method according to claim 1, wherein performing the post-machining operation on the pendulum body includes grinding the plurality of contact points via a CNC grinding device.

7. The method according to claim 1, wherein performing the post-machining operation on the pendulum body includes reaming the plurality of contact points via a chisel device.

8. The method according to claim 1, wherein performing the post-machining operation on the pendulum body includes removing material from the plurality of contact locations to define the friction-reducing finished surface on at least one of a pendulum head, an outer side of a pendulum foot and a pendulum neck without post-machining the prefabricated surface.

9. A pendulum for a pendulum slide cell pump, comprising:
    a prefabricated pendulum body defining an outer contour and a plurality of contact locations disposed about the outer contour at positions defining a sliding surface of the pendulum body that contacts at least one of an outer rotor and an inner rotor;
    wherein the plurality of contact locations have a post-machined finished surface, and the outer contour of the pendulum body has an unfinished surface in a region spaced away from the plurality of contact locations.

10. The pendulum according to claim 9, wherein the unfinished surface of the pendulum body is defined by a prefabrication technique including at least one of forging, rolling, pultrusion and extrusion.

11. The pendulum according to claim 9, wherein the plurality of contact locations include at least one of a pendulum head, an outer side of a pendulum foot and a pendulum neck.

12. The pendulum according to claim 9, wherein the post-machined finished surface of the plurality of contact locations includes at least one of a ground surface and a reamed surface.

13. The pendulum according to claim 9, wherein the post-machined finished surface of the plurality of contact locations is defined by a friction-reducing ground surface and the unfinished surface of the outer contour of the pendulum body is defined by a prefabricated surface without grinding.

14. The pendulum according to claim 13, wherein the plurality of contact locations includes at least a pendulum head and a lateral side of the pendulum foot.

15. A pendulum slide cell pump, comprising:
    an outer rotor;
    an inner rotor;
    at least one pendulum connected to the outer rotor and the inner rotor, the at least one pendulum including:
        a prefabricated pendulum body defining an outer contour;

a plurality of contact locations disposed about the outer contour, the plurality of contact locations respectively defined by a portion of the pendulum body that contacts at least one of the inner rotor and the outer rotor;

wherein the outer contour has a friction-reducing post-machined surface only at the plurality of contact locations compared to a surface of the pendulum body disposed in a region of the outer contour spaced away from the plurality of contact locations.

16. The pendulum slide cell pump according to claim 15, wherein the surface of the pendulum body spaced away from the plurality of contact locations defines a prefabricated surface without post-machining.

17. The pendulum slide cell pump according to claim 15, wherein the post-machined surface of the plurality of contact points is at least one of ground via a CNC grinding device and reamed via a chisel.

18. The pendulum slide cell pump according to claim 15, wherein the plurality of contact locations include at least one of a pendulum head, an outer side of a pendulum foot and a pendulum neck.

19. The pendulum slide cell pump according to claim 18, wherein the at least one of the pendulum head, the outer side of the pendulum foot and the pendulum neck is at least one of ground and reamed.

20. The pendulum slide cell pump according to claim 15, wherein the pendulum body is prefabricated via at least one of forging, rolling, pultrusion and extrusion.

* * * * *